United States Patent
Nakata et al.

(10) Patent No.: US 9,268,521 B2
(45) Date of Patent: Feb. 23, 2016

(54) RECORDING MEDIUM, INFORMATION PROCESSING DEVICE, INFORMATION PROCESSING SYSTEM AND INFORMATION PROCESSING METHOD

(71) Applicant: NINTENDO CO., LTD., Kyoto (JP)

(72) Inventors: Tetsuya Nakata, Kyoto (JP); Hirohito Yoshimoto, Kyoto (JP); Keiko Kinoshita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 253 days.

(21) Appl. No.: 13/734,456

(22) Filed: Jan. 4, 2013

(65) Prior Publication Data

US 2013/0297052 A1     Nov. 7, 2013

(30) Foreign Application Priority Data

May 2, 2012    (JP) ................................ 2012-105362

(51) Int. Cl.
*G06F 3/16* (2006.01)
*A63F 13/40* (2014.01)

(52) U.S. Cl.
CPC . *G06F 3/16* (2013.01); *A63F 13/10* (2013.01); *G06F 3/165* (2013.01); *A63F 2300/204* (2013.01); *A63F 2300/6045* (2013.01); *A63F 2300/6072* (2013.01)

(58) Field of Classification Search
None
See application file for complete search history.

(56) References Cited

U.S. PATENT DOCUMENTS

| | | | |
|---|---|---|---|
| 7,734,692 B1 * | 6/2010 | Kaplan et al. | 709/204 |
| 2009/0063156 A1 * | 3/2009 | Squedin et al. | 704/261 |
| 2010/0040240 A1 * | 2/2010 | Bonanno | 381/74 |
| 2011/0228764 A1 * | 9/2011 | Jorgensen et al. | 370/352 |
| 2011/0319170 A1 * | 12/2011 | Shimura et al. | 463/42 |
| 2012/0057719 A1 * | 3/2012 | Andrea et al. | 381/71.11 |
| 2012/0303264 A1 * | 11/2012 | Su et al. | 701/416 |
| 2013/0035777 A1 * | 2/2013 | Niemisto | G10L 21/0208 700/94 |

FOREIGN PATENT DOCUMENTS

JP     9-173642     7/1997

OTHER PUBLICATIONS https://web.archive.org/web/20111103121330/http://www.mumble.com/support/mumble-running-audio-tuning-wizzard.php.
"Mumble-Running the Audio Tuning Wizzard" Nov. 3, 2011.*
http://www.ventrilo.com/tutorial.php. "Ventrilo-Tutorial". 2009.*

* cited by examiner

*Primary Examiner* — Curtis Kuntz
*Assistant Examiner* — Qin Zhu
(74) *Attorney, Agent, or Firm* — Nixon & Vanderhye PC (57) ABSTRACT

An example information processing device may include an operation part and a sound input part. The information processing device may further include at least one processor configured to receive an operation performed with respect to the operation part and receive sound input to the sound input part. The at least one processor may further be configured to perform information processing based on the sound input to a sound input part and, when the operation performed with respect to the operation part is received, substantially invalidate the sound input to the sound input part.

24 Claims, 6 Drawing Sheets

RECORDING MEDIUM, INFORMATION PROCESSING DEVICE, INFORMATION PROCESSING SYSTEM AND INFORMATION PROCESSING METHOD

CROSS-REFERENCE TO RELATED APPLICATIONS

This application is based upon and claims the benefit of priority of the prior Japanese Patent Application No. 2012-105362, filed on May 2, 2012, the entire contents of which are incorporated herein by reference.

FIELD

The technology herein relates to a recording medium, an information processing device, an information processing system and an information processing method performing information processing based on sound input from a sound input part.

BACKGROUND AND SUMMARY

Conventionally, there is a device provided with an operation part such as a button, a key board or a touch-sensitive panel for the user to perform operation and a sound input part such as a microphone. Examples of such devices include various types of devices such as a game machine, a mobile phone, a personal computer and a voice recorder.

There has been such a problem in a device including both an operation part and a sound input part that operation sound generated at the operation part is input to the sound input part when the user performs operation with respect to the operation part. This problem tends to arise when the sound input part is located near the operation part or when the operation part and sound input part are placed in one housing.

In a game machine for example, a so-called voice chat is widely used, which is a function of transmitting sound between game machines through a network for users to have conversations. Here, the users have conversations while performing game operation. This causes operation sound to be input to the sound input part, transmitted through a network and output to a device on the other party's side. Such operation sound may be uncomfortable noise to the user.

An example information processing device described herein involves an operation acceptance part for accepting operation performed with respect to an operation part; a sound information processing part for performing information processing based on sound input to a sound input part; and a sound invalidation part for substantially invalidating sound input to the sound input part when the operation with respect to the operation part is accepted by the operation acceptance part.

The above and further objects, features, aspects and effects of the technology described herein will more fully be apparent from the following detailed description with accompanying drawings.

DETAILED DESCRIPTION OF NON-LIMITING EXAMPLE EMBODIMENTS

Figure 1:
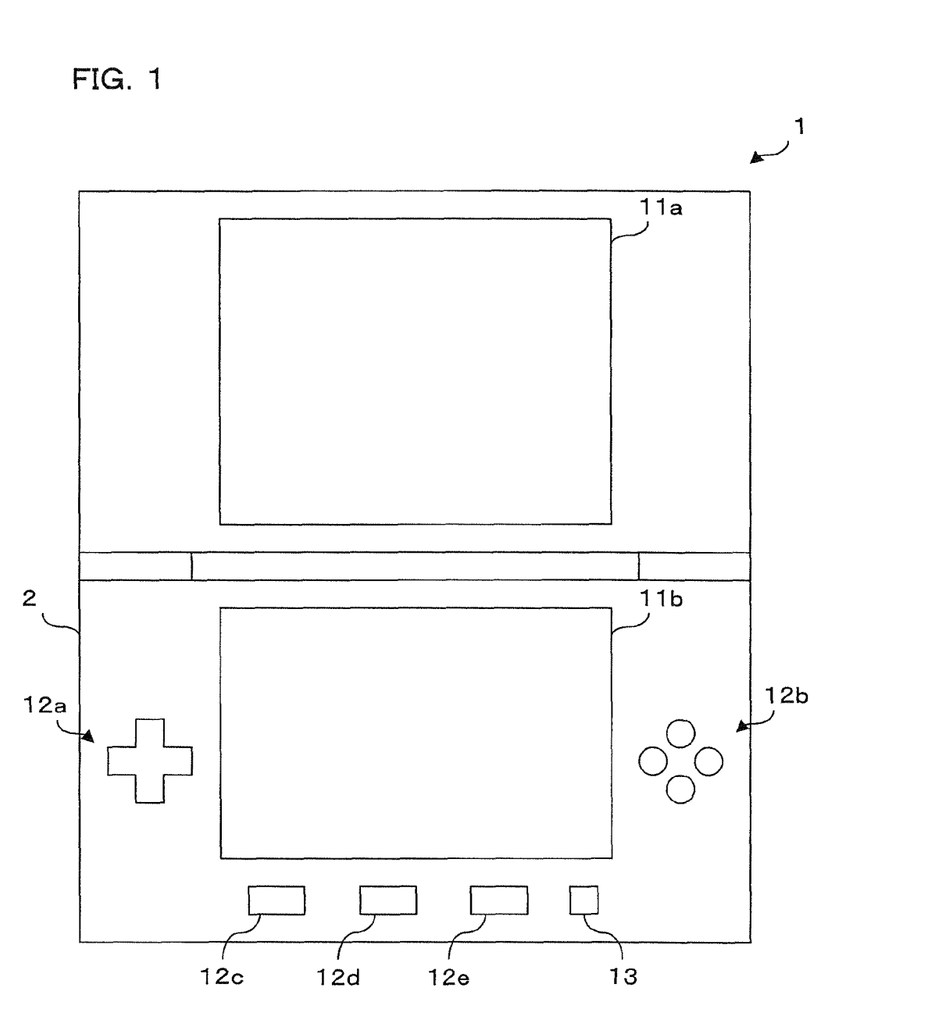
FIG. 1 shows an example non-limiting schematic plan view illustrating an appearance of a game machine according to an example embodiment.

A recording medium, an information processing device, an information processing system and an information processing method will specifically be described below with examples of a game program and a game machine in reference to the drawings illustrating embodiments thereof. FIG. 1 is a schematic plan view illustrating an appearance of a game machine according to the present embodiment. A game machine 1 according to the present embodiment includes a housing 2 with a structure in which a top housing and a bottom housing, each having a flat and substantially rectangular-parallelepiped shape, are rotatably connected together with a hinge. The housing 2 can be opened and closed such that the one surface of the top housing and one surface of the bottom housing are in contact with each other. At the top housing of the housing 2 is provided with a first display part 11a having a substantially rectangular-parallelepiped shape at an approximately middle part of a surface which faces the user of the game machine 1 when the housing 2 is opened. Likewise, the bottom housing is provided with a second display part 11b having a substantially rectangular-parallelepiped shape at an approximately middle part of a surface which faces the user of the game machine 1 when the housing 2 is opened.

At the bottom housing of the housing 2, an arrow key 12a is placed at the left side of the second display part 11b, while push buttons 12b are placed at the right side thereof. At the bottom housing of the housing 2, push buttons 12c to 12e are further arranged in the horizontal direction below the second display part 11b. Also at the bottom housing of the housing 2, a microphone 13 is provided at the right side adjacent to the push button 12e. The arrow key 12a and push buttons 12b to 12e are for accepting operation of the user by detecting a displacement of an operation portion (e.g., up-and-down movements thereof associated with operation such as pressing it down).

Figure 2:
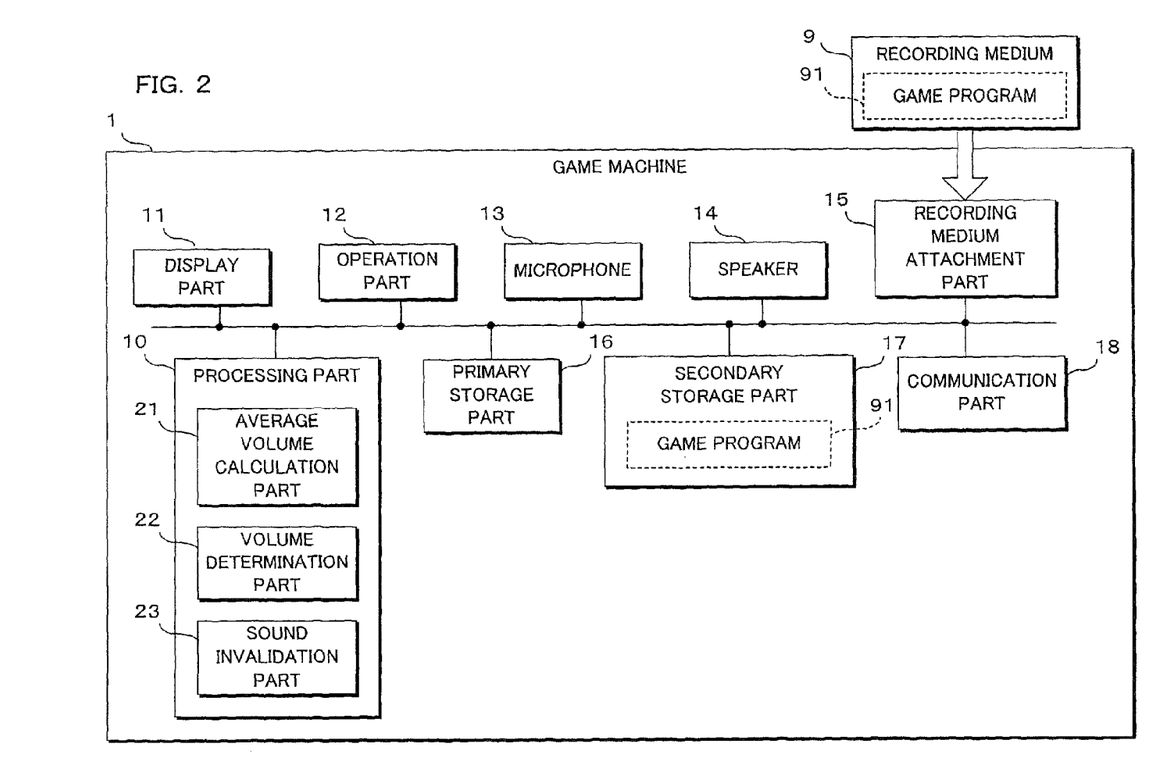
FIG. 2 shows an example non-limiting block diagram illustrating a configuration of the game machine according to the an example embodiment.

FIG. 2 is a block diagram illustrating a configuration of the game machine 1 according to the present embodiment. The game machine 1 includes a processing part 10 configured with an arithmetic processing device such as a CPU (Central Processing Unit) or a MPU (Micro Processing Unit). The processing part 10 reads out a game program 91 stored in a secondary storage part 17 or the game program 91 recorded in a recording medium 9 attached to a recording medium attachment part 15, to a primary storage part 16. The processing part 10 executes the read-out game program 91 to perform various types of information processing related to a game. For example, the processing part 10 executes processing of accepting an operation performed with respect to the operation part 12 and processing of, e.g., determining a game in accordance with the accepted operation. Moreover, the processing part 10 executes, for example, processing of generating a game image displayed on the display part 11 in response to the accepted operation, an event in a game or the like, processing of accepting sound input to the microphone 13, and processing of outputting sound from the speaker 14.

The display part 11 includes the first display part 11a and the second display part 11b described above. The display part 11 is configured with a liquid-crystal panel or a PDP (Plasma Display Panel) and displays an image provided by the processing part 10. The operation part 12 includes, for example, the arrow key 12a and push buttons 12b to 12e as described above. The operation part 12 notifies the processing part 10 of the content of the operation performed by the user (e.g., pressing down or releasing of a button). The microphone 13 is for the user to input sound and sends the input sound to the processing part 10 as sound data. The speaker 14 outputs sound according to the sound data sent from the processing part 10. The recording medium attachment part 15 is so configured that the recording medium 9 of a type of a card, cassette, disk or the like can be attached thereto and removed therefrom. The processing part 10 can read out the game program 91 and other data from the recording medium 9 attached to the recording medium attachment part 15.

The primary storage part 16 is configured with a semiconductor memory element or the like. The primary storage part 16 temporarily stores various types of data generated along with arithmetic processing performed by the processing part 10. The secondary storage part 17 is configured with a non-volatile storage device having a larger volume compared to the primary storage part 16. The secondary storage part 17 stores the game program 91 and the other data.

The communication part 18 transmits/receives data to/from the server device or another game machine 1 through a network such as a mobile phone network or wireless LAN (Local Area Network). For example, the game machine 1 can perform communication with the server device through the communication part 18 and downloads the game program 91 to store it in the secondary storage part 17. For example, the game machine 1 can communicate with another game machine 1 through the communication part 18 so that several users can cooperate with or battle against one another. Moreover, the game machine 1 according to the present embodiment has a function of realizing conversation among plural users by transmitting or receiving sound input from the microphone 13 to/from another game machine 1 through the communication part 18, i.e. a so-called voice chat function. This voice chat function allows the user of the game machine 1 to play a game while having a conversation with another user.

The processing related to the voice chat function of the game machine 1 is performed at an average volume calculation part 21, a volume determination part 22, a sound invalidation part 23 and the like in the processing part 10. Each of these three blocks as shown in FIG. 2 is a software-based functional block implemented by the processing part 10 executing the game program 91. Any or all of the three blocks may, however, also be implemented as a hardware-based block or hardware-based blocks.

Next, the voice chat function of the game machine 1 according to the present embodiment will be described. The game machine 1 transmits the sound input through the microphone 13 to another game machine 1 through the communication part 18, while receiving sound from another game machine 1 at the communication part 18 to output it from the speaker 14. This realizes the voice chat function. The users, however, are not constantly having conversation. Thus, in order to reduce transmission of unnecessary data, the game machine 1 determines whether or not the user is speaking (producing sound for conversation) based on the volume of the sound input to the microphone 13, and transmits the sound through the communication part 18 if it is determined that the user is speaking.

The processing part 10 in the game machine 1 stores data of the sound input at the microphone 13 in the primary storage part 16 or the secondary storage part 17 (hereinafter abbreviated to "storage part 16 or 17") for a given time period Tm. Moreover, the processing part 10 periodically samples the volume of the sound input to the microphone 13 and stores the volume sampled during a given time period Tv (wherein Tv>Tm) in the storage part 16 or 17. The average volume calculation part 21 in the processing part 10 calculates an average amount of the stored volume for the given time period Tv. The volume determination part 22 in the processing part 10 performs arithmetic operation by, for example, multiplying the average volume by a given coefficient based on the average volume calculated by the average volume calculation part 21, to calculate a volume threshold for determination. The volume determination part 22 compares the calculated volume threshold with the volume of sound input to the microphone 13 at the current time point, to determine whether or not the volume at the current time point exceeds the volume threshold. If the volume determination part 22 determines that the volume at the current time point exceeds the volume threshold, the processing part 10 starts transmission of sound through the communication part 18. Accordingly, the sound input to the microphone 13 is sequentially transmitted from the communication part 18. This sound transmission is continuously performed until a given termination condition is satisfied. In the description below, a state where the voice transmission is continuously performed at the communication part 18 will be referred to as "active state," whereas a state where no voice transmission is performed will be referred to as "silent state" in the voice chat function.

In the active state, the processing part 10 performs, for example, storage of the sound input to the microphone 13 and periodical sampling of the volume of sound, as in the case with the silent state. The volume determination part 22 in the processing part 10 compares the volume threshold based on the average volume, when switched from the silent state to the active state, with the volume of the sound input to the microphone 13 at the current time point. The processing part 10 stops sound transmission through the communication part 18 (switches from the active state to the silent state), if a state where the current volume is less than the volume threshold continues for the given period Tr.

As such, the game machine 1 detects a user's speech and starts sound transmission, and stops the sound transmission after the given time period Tr has elapsed from the time when the speech is finished. Thus, the game machine 1 can reliably transmit the sound spoken by the user, while reducing unwanted data transmission during a period with no speech. Furthermore, the processing part 10 of the game machine 1 stores the received sound data in the storage part 16 or 17 when sound transmitted by another game machine 1 is received at the communication part 18. The processing part 10 sequentially sends the stored sound data to the speaker 14 to output sound from the speaker 14. Thus, transmission of sound can be carried out among several game machines 1 through a network, thereby realizing a voice chat.

It is highly possible that the voice chat function at the game machine 1 is utilized by the user while playing a game. Here, the user performs operation with respect to the operation part 12 and speech to the microphone 13. If, for example, an operation such as pressing down of the push button 12b is performed, operation sound is generated at the operation part 12 and is input to the microphone 13. As illustrated in FIG. 1, in the game machine 1 having the operation part 12 and microphone 13 in the same housing 2 or the game machine 1 having the microphone 13 located near the operation part 12 (e.g., the microphone 13 located adjacent to the operation part 12), the operation sound of the operation part 12 may possibly be input to the microphone 13 as loud sound.

In the silent state where the user is not speaking and no sound transmission is performed through the communication part 18, when operation sound is input to the microphone 13, it is determined at the volume determination part 22 that the volume of the operation sound exceeds a volume threshold. It is thus possible that the state switches to the active state where the operation sound may be transmitted through the communication part 18. While the operation sound is output from the speaker 14 at the game machine 1 on the other party's side in the voice chat function, the operation sound output without the sound of speech makes the user on the other party's side feel uncomfortable.

The game machine 1 according to the present embodiment prevents the operation sound from causing it to switch from the silent state to the active state in the voice chat function, in order to invalidate the input of the operation sound of the operation part 12 with respect to the microphone 13. The processing part 10 in the game machine 1 performs processing of a game in accordance with the content of operation performed with respect to the operation unit 12. If operation is performed with respect to the operation unit 12 during the silent state, the sound invalidation part 23 in the processing part 10 prohibits the switching from the silent state to the active state for the given time period Tb from the time point of the operation. Thus, the sound invalidation part 23 invalidates the operation sound input to the microphone 13 for the given time period Tb from the time point of operation, preventing the operation sound from being transmitted through the communication part 18.

If, however, the operation with respect to the operation part 12 is performed in the active state, the sound invalidation part 23 does not invalidate the operation sound, while the processing part 10 transmits the sound input from the microphone 13 through the communication part 18. This is because the user of the game machine 1 is highly likely to be speaking when the state has already switched to the active state, and thus the user's speech may possibly be cut off if the sound is not transmitted when operation is performed with respect to the operation part 12.

It is noted that the sound invalidation part 23 not only prohibits switching to the active state when operation is performed with respect to the operation part 12 in the silent state but may also use another method to prevent the operation sound from being transmitted. As described above, the volume determination part 22 compares the volume at the current time point with the sound threshold and performs determination thereon. As another method, if, for example, the operation with respect to the operation part 12 is performed in the silent state, the volume invalidation part 23 may forcibly reduce the volume at the current time point used in determination by the volume determination part 22 to 0 (or volume lower than the volume threshold). By forcibly reducing the volume at the current time point to 0 for the given time period Tb from the time point of operation, the volume determination part 22 will not determine that the volume of the current time point exceeds the volume threshold. Furthermore, the state will not switch from the silent state to the active state, so that the operation sound can be prevented from being transmitted through the communication part 18.

Figure 3:
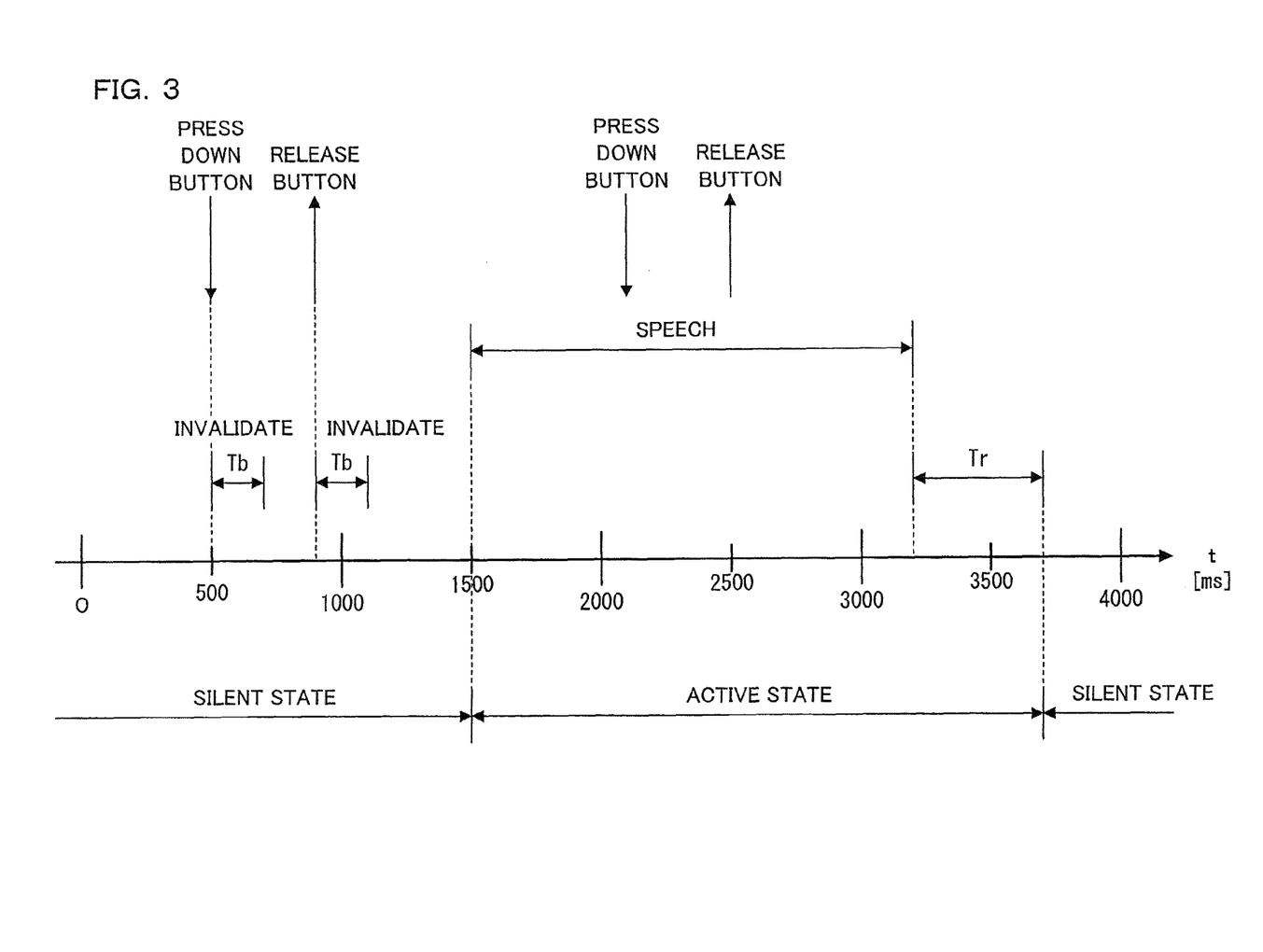
FIG. 3 shows an example non-limiting schematic view for illustrating invalidation processing of operation sound.

FIG. 3 is a schematic view for illustrating the invalidation processing of operation sound. An example of the processing is illustrated as a timing chart. In the present example, the given time period Tb is set as 200 ms, during which the operation sound is invalidated from the time point when the operation is performed with respect to the operation part 12 in the silence state, whereas the given time period Tr is set at 500 ms, which is used to determine whether or not the active state switches to the silent state.

In the present example, the processing part 10 in the game machine 1 in the initial state (t=0 ms) is in the silent state regarding the voice chat function. If the user, for example, presses down the push button 12*b* on the operation part 12 after 500 ms have elapsed, the processing part 10 accepts the pressing down operation. The processing part 10 prohibits, at the sound invalidation part 23, switching to the active state for the given time period Tb=200 ms from the time point of operation (T=500 ms) and invalidates the operation sound input to the microphone 13. After the given time period Tb and further 200 ms has elapsed for example, if the user releases (stops pressing down) the push button 12*b* at the time point of t=900 ms, the processing part 10 accepts this releasing operation. The processing part 10 prohibits, at the sound invalidation part 23, the switching to the active state for the given time period Tb=200 ms from the time point of operation, and invalidates the operation sound input to the microphone 13.

Subsequently, assume that the user is speaking for a period of, for example, t=1500 ms to 3200 ms. At the time point of t=1500 ms, the volume determination part 22 determines that the volume at the current time point exceeds the volume threshold, and the processing part 10 switches from the silent state to the active state to start transmission through the communication part 18 for the sound input to the microphone 13. After switching to the active state, if, for example, the push button 12*b* is pressed down at the time point of t=2100 ms, the processing part 10 continuously transmits the sound through the communication part 18 even if the push button 12*b* is released at the time point of t=2500 ms. Thus, if operation sound is generated at the time point of t=2100 ms or 2500 ms, the sound including the operation sound is transmitted through the communication part 18.

If the user finishes speaking at the time point of t=3200 ms, the volume determination part 22 determines that the volume at the current time point is less than the volume threshold. If the state where the volume at the current time point is less than the volume threshold continues for the given time period Tr=500 ms, the processing part 10 switches from the active state to the silent state at the time point of t=3700 ms to stop the sound transmission through the communication part 18.

Figure 4:
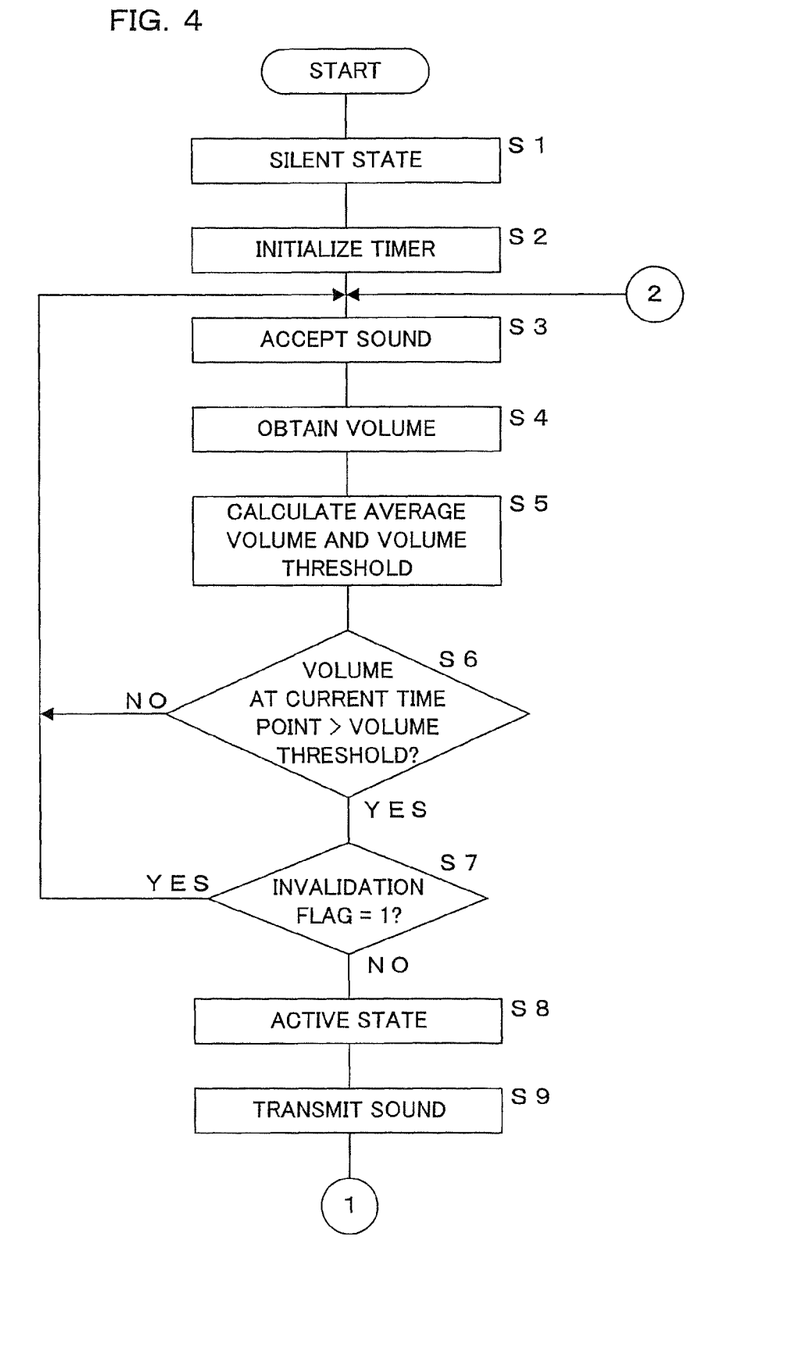
FIG. 4 shows an example non-limiting flowchart illustrating a procedure of sound transmission processing performed by the game machine.
Figure 5:
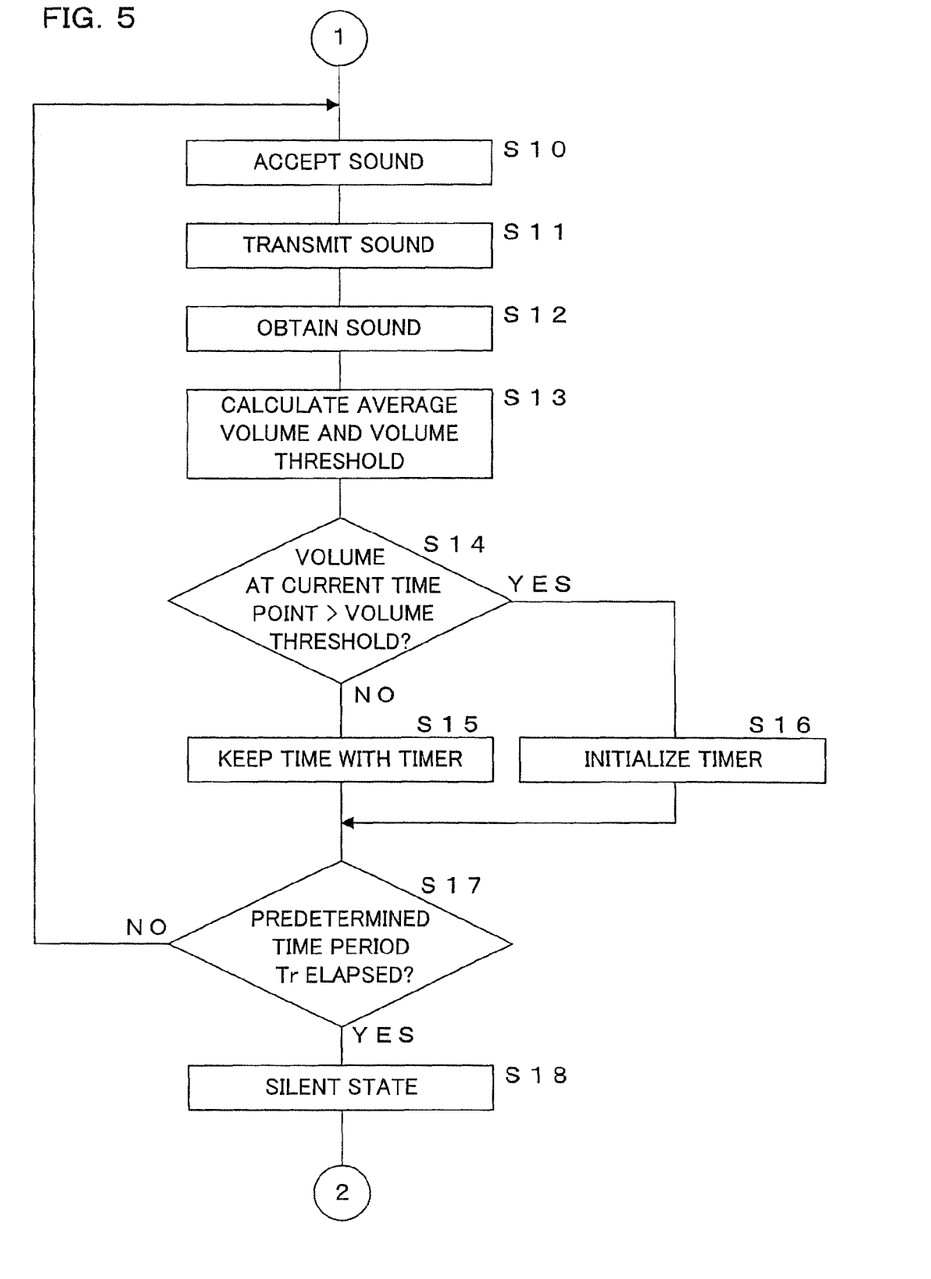
FIG. 5 shows an example non-limiting flowchart illustrating a procedure of sound transmission processing performed by the game machine.

FIGS. 4 and 5 show a flowchart illustrating a procedure of sound transmission processing performed by the game machine 1. The processing part 10 in the game machine 1 starts processing as the silent state at first (Step S1), and initializes a timer (Step S2). The timer used in the sound transmission processing is to time the given time period Tr used to determine the switching from the active state to the silent state, and is included, for example, in the processing part 10 as a software-based or hardware-based function.

The processing part 10 accepts sound input from the microphone 13 (Step S3). The accepted sound is stored in the storage part 16 or 17 during the given time period Tm. Here, the processing part 10 also obtains the volume of the accepted sound periodically (Step S4). The volume is stored in the storage part 16 or 17 during the given time period Tv. The processing part 10 calculates at the average volume calculation part 21 an average of the volume stored during the given time period Tv and a volume threshold based on the average volume (Step S5), and determines at the volume determination part 22 whether or not the volume at the current time point exceeds the calculated volume threshold (Step S6).

If it is determined that the volume at the current time point exceeds the volume threshold (S6: YES), the processing part 10 further determines whether or not the value of an invalidation flag is 1 (Step S7). Note that the invalidation flag is a flag indicating whether or not the sound input to the microphone 13 is invalidated. For the invalidation flag, a value of 0 or 1 is set in sound invalidation processing, which will be described later (see FIG. 6). The sound input is invalidated when the value of 1 is set for the invalidation flag, whereas the sound input is not invalidated when the value of 0 is set therefor. The invalidation flag is realized using a storage area such as a register in the processing part 10 or the primary storage part 16.

If the volume at the current time point does not exceed the volume threshold (S6: NO), or if the value of the invalidation flag is 1 (S7: YES), the processing part 10 returns the processing to step S3 to repeat the processing at steps S3 through S7 in the silent state.

If the invalidation flag is 0 (S7: NO), the processing part 10 switches from the silent state to the active state (Step S8), sends the sound stored in the storage part 16 or 17 to the communication part 18 and transmits the sound through a network (Step S9). Here, it is possible to transmit all the sound generated during the given time period Tm that are stored in the storage part 16 or 17, or to transmit a part of the sound such as, for example, the sound generated after the time point when it is determined that the volume exceeds the volume threshold.

Subsequently, the processing part 10 accepts sound input from the microphone 13 (Step S10). The processing part 10 transmits the accepted sound through the communication part 18 (Step S11). The processing part 10 periodically obtains the volume of the accepted sound (Step S12) and calculates, at the average volume calculation part 21, the average volume for the given time period Tv and the volume threshold (Step S13). The processing part 10 determines at the volume determination part 22 whether or not the volume at the current time point exceeds the volume threshold (Step S14).

If it is determined that the volume at the current time point does not exceed the volume threshold (S14: NO), the processing part 10 performs time keeping using the timer (Step S15). In other words, the processing part 10 starts keeping time with the timer at step S15 if the timer is in the initialized state, and continues time keeping if the timer is currently keeping time. Furthermore, if it is determined that the volume at the current time point exceeds the volume threshold (S14: YES), the processing part initializes the timer (Step S16). Note that the processing part 10 does not need to further initialize the timer at step S16 if the timer has already been initialized.

Subsequently, the processing part 10 determines whether or not the given time period Tr has elapsed based on the time kept with the timer (step S17). If the given time period Tr has not elapsed (S17: NO), the processing part 10 returns the processing to step S10 and repeats the processing at steps S10 through S17 in the active state. If the given time period Tr has elapsed (S17: YES), the processing part 10 switches from the active state to the silent state (Step S18), and returns the processing to step S3 to repeat the processing described above.

Figure 6:
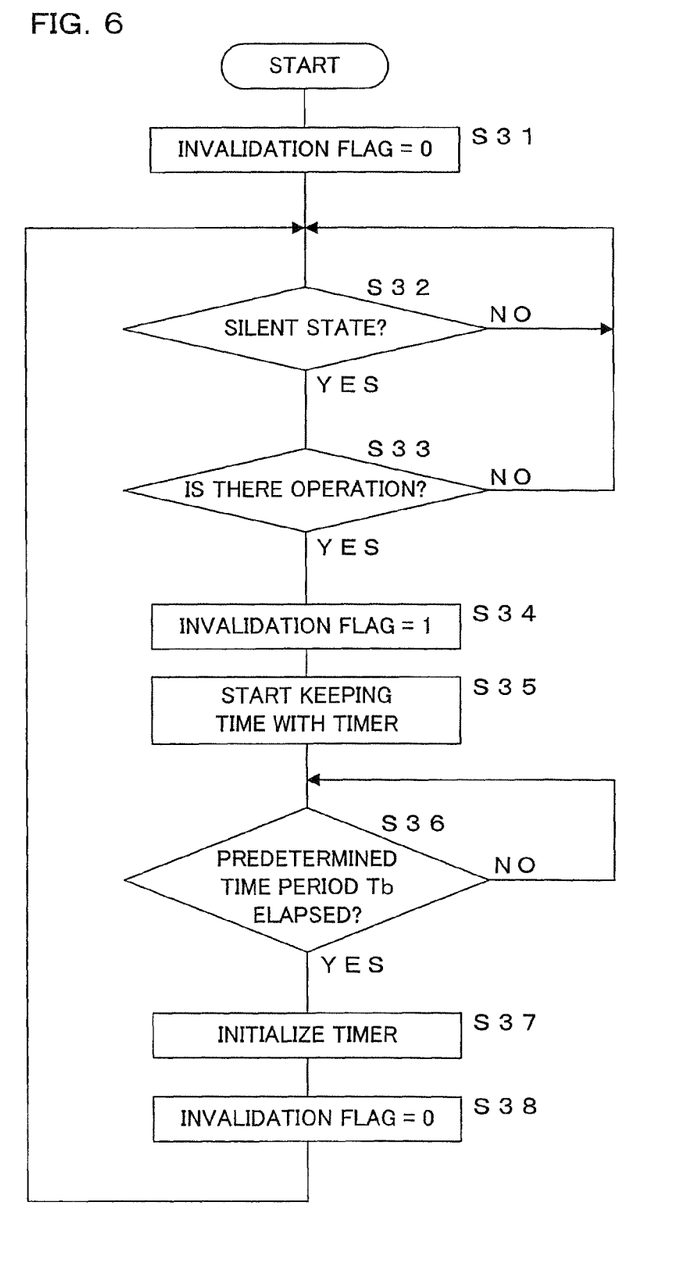
FIG. 6 shows an example non-limiting flowchart illustrating a procedure of sound invalidation processing performed by the game machine.

FIG. 6 is a flowchart illustrating a procedure of sound invalidation processing performed by the game machine 1, which is executed in parallel with the sound transmission processing as described above. Note that, the invalidation flag and timer as described above are used in the sound invalidation processing, while the timer may be the same as or different from the one used in the sound transmission processing. The sound invalidation part 23 in the processing part 10 first sets the value of the invalidation flag to be 0 (Step S31). Subsequently, the sound invalidation part 23 determines whether or not it is in the silent state (Step S32). If it is in the silent state (S32: YES), the sound invalidation part 23 further determines whether or not operation is performed with respect to the operation part 12 (step S33). If it is not in the silent state (S32: NO) or if no operation is performed (S33: NO), the sound invalidation part 23 repeats determination until conditions in both steps S32 and S33 are satisfied.

If operation with respect to the operation part 12 is performed (S33: YES), the sound invalidation part 23 sets the value of the invalidation flag to 1 (Step S34) and starts time keeping with the timer (Step S35). The sound invalidation part 23 determines whether or not the given time period Tb has elapsed based on the time kept with the timer (Step S36) and, if the given time period Tb has not elapsed (S36: NO), it waits until the given time period Tb elapses. If the given time period Tb has elapsed (S36: YES), the sound invalidation part 23 initializes the timer (Step S37), sets the value of the invalidation flag to 0 (Step S38) and returns the processing to step S32 to repeat the processing as described above.

The game machine 1 with the configuration as described above invalidates the sound input to the microphone 13 for the given time period Tb when operation is performed with respect to the operation part 12. This can invalidate operation sound generated at the operation part 12 even if the operation sound is input to the microphone 13. Thus, the game machine 1 can prevent transmission of unnecessary operation sound and output of such sound from the speaker 14 at the game machine 1 on the other party's side when using the voice chat function.

The game machine 1 obtains the volume of the input sound by sampling it periodically and calculates an average of the volume obtained during the most recent given time period Tv. The game machine 1 determines whether or not the volume at the current time point exceeds the volume threshold based on the average volume. The game machine 1 switches from the silent state to the active state when the volume exceeds the volume threshold and starts sound transmission through the communication part 18. Moreover, if the state where the volume at the current time point does not exceed the volume threshold continues for the given time period Tr, the game machine 1 switches from the active state to the silent state and stops the sound transmission. Thus, sound is transmitted when the user is speaking whereas no sound is transmitted when the user is not speaking, i.e., in a soundless state, so that transmission of unnecessary sound may be reduced.

In such a configuration that the silent state and active state are switched between each other to perform information processing for sound transmission, the game machine 1 realizes invalidation of operation sound by prohibiting switching to the active state and not performing sound transmission when operation performed with respect to the operation part 12 is accepted in the silent state. Moreover, the game machine 1 does not perform invalidation when the operation performed with respect to the operation part 12 is accepted in the active state and transmits sound including operation sound. This allows the game machine 1 to invalidate the operation sound generated when the user is not speaking. The game machine 1 can further prevent invalidation of the sound of a speech together with the operation sound, since it does not invalidate the operation sound generated while the user is speaking.

Though an example of the game machine 1 was described for explaining the information processing program, the information processing device and the like in the present embodiment, such a program and a device can also be applied not only to the game machine 1 but also to various other devices having an operation part and a sound input part. If, for example, recording is started/stopped in a sound recording device such as a voice recorder by determining presence/absence of a user's speech, processing similar to the one with the game machine 1 of the present embodiment may be performed, preventing such a problem that recording is started in response to operation sound and the operation sound is recorded. Moreover, in a mobile phone with a camera function, for example, such a configuration may be employed that sound transmission may be controlled to be stopped during a period in which shutter sound (or sound effect thereof) of a camera is being generated when the user takes a photograph with the camera.

Furthermore, though the game machine 1 is configured to be provided with the arrow key 12a and push buttons 12b to 12e as the operation part 12, it is not limited thereto. For example, an operation part including, for example, a dial switch, a slide switch or a touch-sensitive panel may also be employed. Moreover, the outer appearance of the game machine 1 is not a limitation but a mere example, and the arrangement of the display part 11, the operation part 12 and the microphone 13 as well as the shape or the like of the housing 2 may have various other forms. In addition, though such a configuration was described that the volume determination part 22 calculates a volume threshold by multiplying the average volume by a given coefficient and compares the volume at the current time point with the volume threshold, it is not limited thereto. For example, a value obtained by adding or subtracting given volume to/from the average volume may be set as the volume threshold, or the average volume itself may be set as the volume threshold. Moreover, the numeric values for the given time periods Tb and Tr illustrated in FIG. 3 are not limitation but mere examples. For the given time period Tb during which sound is invalidated, it is preferable to find out a period in which operation sound is generated in accordance with the configurations of the game machine 1 and the operation part 12, and to decide an appropriate value in a design stage of the game machine 1 or game program 91. Furthermore, if there are more than one operation parts 12 in the game machine 1, the given time period Tb may have different values for each operation unit 12, instead of one value.

Though, in the present embodiment, the game machine 1 is so configured as to invalidate operation sound by not switching its state to the active state when operation with respect to the operation part 12 is performed in the silent state, it is not limited thereto. It may also be configured that, for example, when operation with respect to the operation part 12 is performed in the silent state, the state switches to the active state in response to the operation sound generated along with the operation, while the volume of the sound generated during the given time period Tb from the time point of operation may be reduced to 0 (small volume not more than given volume) and then transmitted. Such a configuration can obtain an effect similar to that of the game machine 1 according to the present embodiment, since the sound generated during the given time period Tb which includes operation sound is transmitted with the volume of 0, and thus the operation sound is not output from the speaker 14 at the game machine 1 on the other party's side. The invalidation of sound input by the game machine 1 according to the present embodiment is not only for completely invalidating the input of operation sound. It also includes reduction of the effect of the input of operation sound by reducing volume, i.e. substantial invalidation of the input of operation sound.

Furthermore, though such a configuration is employed in the present embodiment that sound input is invalidated at the game machine 1 on the sound transmitting side, it is not limited thereto. Another configuration may also be employed that the sound input is substantially invalidated by, for example, not outputting sound received by the game machine 1 on the sound receiving side or outputting such sound with reduced volume. Here, for example, the game machine 1 on the sound transmitting side transmits information or the like indicating presence/absence of operation with respect to the operation part 12 together with sound. The game machine 1 on the sound receiving side either stops outputting the received sound or outputs the received sound while reducing its volume to be not more than a given volume for the given time period Tb from the time point when operation is performed.

According to one aspect, when operation is performed with respect to the operation part, operation sound input during a given period can substantially be invalidated by substantially invalidating the sound input during the given period. This can suppress unnecessary sound being transmitted and output to the other party's side when using, for example, a voice chat function.

It should be understood that, when used in the present specification, an element and the like preceded by a preposition "a" or "an" does not exclude a plural form of such element.

What is claimed is:

1. A non-transitory recording medium recording a program executed by a handheld gaming device including an operation part and a sound input part, the program, when executed, causing the handheld gaming device to perform operations comprising:
   receiving an operation performed with respect to the operation part;
   receiving sound input to the sound input part;
   determining whether or not volume of the sound input to the sound input part exceeds a threshold;
   when a volume of the sound input to the sound input part exceeds the threshold, performing information processing based on the sound input to the sound input part; and
   when the operation performed with respect to the operation part is received while a volume of the sound input to the sound input part is less than the threshold, substantially invalidating the sound input to the sound input part for a time period from a time point when the operation with respect to the operation part is received.

2. The recording medium according to claim 1, wherein the sound input to the sound input part is not substantially invalidated if the operation with respect to the operation part is received after information processing is started.

3. The recording medium according to claim 1, wherein the information processing based on the received sound is stopped if it is determined that the volume does not exceed the threshold for a given continuous time period.

4. The recording medium according to claim 1, wherein the program, when executed, further causes the handheld gaming device to calculate an average volume of the sound input to the sound input part during a given calculation period, wherein
   a value is determined according to the calculated average volume as the threshold.

5. The recording medium according to claim 4, wherein a value is determined according to the calculated average volume as the threshold, for the most recent calculation period for which the determination is performed.

6. The recording medium according to claim 1, wherein invalidating the sound includes reducing the volume of the sound input to the sound input part to a predetermined volume or lower.

7. The recording medium according to claim 1, wherein the information processing based on the sound input to the sound input part is not allowed when the sound input to the sound input part is invalidated.

8. The recording medium according to claim 1, wherein the information processing performs communication processing of transmitting the sound input to the sound input part.

9. The recording medium according to claim 8, wherein the information processing performs processing concerning output of sound received through the communication processing.

10. The recording medium according to claim 9, wherein invalidating the sound does not allow the information processing to output sound.

11. The recording medium according to claim 9, wherein invalidating the sound reduces volume of sound output by the information processing to a predetermined volume or lower.

12. The recording medium according to claim 8, wherein invalidating the sound does not allow the information processing to transmit sound.

13. The recording medium according to claim 8, wherein invalidating the sound reduces volume of sound transmitted by the information processing to a predetermined volume or lower.

14. A handheld gaming device comprising at least one processor, the at least one processor being configured to:
receive an operation performed with respect to an operation part;
receive sound input to a sound input part;
determine whether or not volume of the sound input to the sound input part exceeds a threshold;
when a volume of the sound input to the sound input part exceeds the threshold, perform information processing based on the sound input to the sound input part; and
when the operation performed with respect to the operation part is received while a volume of the sound input to the sound input part is less than the threshold, substantially invalidate the sound input to the sound input part for a time period from a time point when the operation with respect to the operation part is received.

15. The handheld gaming device according to claim 14, wherein
the sound input part is located near the operation part.

16. The handheld gaming device according to claim 14, wherein
the operation part and the sound input part are placed in one housing.

17. The handheld gaming device according to claim 14, wherein
the operation part has a portion being displaced in accordance with the operation.

18. A handheld gaming system comprising:
an operation part;
a sound input part; and
processing circuitry in communication with the operation part and the sound input part, wherein the processing circuitry is configured to:
receive an operation performed with respect to the operation part;
receive sound input to the sound input part;
determine whether or not volume of the sound input to the sound input part exceeds a threshold;
when a volume of the sound input to the sound input part exceeds the threshold, perform information processing based on the sound input to the sound input part; and
when the operation performed with respect to the operation part is received while a volume of the sound input to the sound input part is less than the threshold, substantially invalidating the sound input to the sound input part for a time period from a time point when the operation with respect to the operation part is received.

19. An information processing method carried out by a handheld gaming device comprising an operation part and a sound input part, the information processing method comprising:
receiving an operation performed with respect to the operation part;
receiving sound input to the sound input part;
determining whether or not volume of the sound input to the sound input part exceeds a threshold;
when a volume of the sound input to the sound input part exceeds the threshold, performing information processing based on the sound input to the sound input part; and
when the operation performed with respect to the operation part is received while a volume of the sound input to the sound input part is less than the threshold, substantially invalidating the sound input to the sound input part for a time period from a time point when the operation with respect to the operation part is received.

20. A handheld gaming apparatus, comprising:
a user-manipulable input device;
a microphone; and
processing circuitry coupled to the user-manipulable input device and the sound input device and configured to:
compare a threshold sound level and a level of sound corresponding to sound captured by the microphone;
if the level of the captured sound is greater than the threshold sound level, transmit the sound captured by the microphone to an information processing apparatus; and
if the level of the captured sound is less than the threshold sound level and an input is supplied to the user-manipulable device, to substantially invalidate sound captured by the microphone for a time period after the input is supplied to the user-manipulable device.

21. The handheld gaming apparatus according to claim 20, wherein the processing circuitry substantially invalidates the sound captured by the microphone by transmitting the captured sound to the information processing apparatus with zero sound level.

22. The handheld gaming apparatus according to claim 20, wherein the processing circuitry substantially invalidates the sound captured by the microphone by transmitting the captured sound to the information processing apparatus with a reduced sound level relative to the level of the captured sound.

23. The handheld gaming apparatus according to claim 20, wherein the user-manipulable input device comprises a button.

24. The recording medium according to claim 1, wherein the information processing is performed based on the sound input to the sound input part when the received sound input exceeds the threshold and the sound input to the sound input is not invalidated.

* * * * *